United States Patent
Rong et al.

(10) Patent No.: US 9,619,847 B2
(45) Date of Patent: Apr. 11, 2017

(54) METHOD, DEVICE AND TERMINAL FOR ACTING ON GRAPHICAL OBJECTS DISPLAYED IN A MOBILE APPLICATION

(71) Applicant: Tencent Technology (Shenzhen) Company Limited, Shenzhen (CN)

(72) Inventors: Kunfeng Rong, Shenzhen (CN); Pinlin Chen, Shenzhen (CN); Yang Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 305 days.

(21) Appl. No.: 14/456,861

(22) Filed: Aug. 11, 2014

(65) Prior Publication Data
US 2015/0089402 A1 Mar. 26, 2015

Related U.S. Application Data

(63) Continuation of application No. PCT/CN2014/079049, filed on Jun. 3, 2014.

(30) Foreign Application Priority Data

Sep. 24, 2013 (CN) .......................... 2013 1 0438704

(51) Int. Cl.
*G06F 3/0484* (2013.01)
*G06Q 50/00* (2012.01)
*G06F 3/0488* (2013.01)

(52) U.S. Cl.
CPC ........... *G06Q 50/01* (2013.01); *G06F 3/0488* (2013.01)

(58) Field of Classification Search
CPC ........................... G06F 3/04842; G06F 3/0488
See application file for complete search history.

(56) References Cited

U.S. PATENT DOCUMENTS 6,275,829 B1 * 8/2001 Angiulo .............. G06F 17/3089
2006/0265417 A1 * 11/2006 Amato .............. G06F 17/30864
(Continued)

FOREIGN PATENT DOCUMENTS

| CN | 1838117 A | 9/2006 |
|----|-----------|--------|
| CN | 101789961 A | 7/2010 |

(Continued)

OTHER PUBLICATIONS

Tencent Technology, ISR, PCT/CN2014/079049, Sep. 2, 2014, 3 pgs.

(Continued)

*Primary Examiner* — Anil Bhargava
(74) *Attorney, Agent, or Firm* — Morgan, Lewis & Bockius LLP

(57) ABSTRACT

A method, device and user terminal for acting on graphical objects displayed in a plug-in viewer of a mobile application is disclosed. In response to a first command gesture, a user device displays a webpage in a user interface of a social networking application and the webpage includes one or more images. After detecting a second command gesture, e.g. a sustained-contact, directed to an image or a blank portion of the displayed webpage, certain operations can be performed to the identified image or images. For example, a sustained-contact on the blank portion of the displayed webpage can result in saving all the images of the webpage in the user device or in the cloud. The saving operation can be conducted with or without additional approval from a (Continued)

user. In such a manner, the saving operation on images of a webpage can be performed more efficiently, improving user experience.

20 Claims, 6 Drawing Sheets

(56) References Cited

U.S. PATENT DOCUMENTS

| | | |
|---|---|---|
| 2008/0165133 A1 | 7/2008 | Blumenberg et al. |
| 2010/0031169 A1* | 2/2010 | Jang ............... G06F 1/1624 715/760 |
| 2011/0113346 A1* | 5/2011 | O'Shaugnessy ..... G06Q 10/107 715/752 |
| 2011/0295955 A1 | 12/2011 | Runola |
| 2013/0111368 A1* | 5/2013 | Laughlin .......... G06F 17/30994 715/760 |

FOREIGN PATENT DOCUMENTS

| | | |
|---|---|---|
| CN | 102819560 A | 12/2012 |
| CN | 103488753 A | 1/2014 |

OTHER PUBLICATIONS

Tencent Technology, Written Opinion, PCT/CN2014/079049, Sep. 2, 2014, 5 pgs.
Tencent Technology, IPRP, PCT/CN2014/079049, Mar. 29, 2016, 6 pgs.

\* cited by examiner

METHOD, DEVICE AND TERMINAL FOR ACTING ON GRAPHICAL OBJECTS DISPLAYED IN A MOBILE APPLICATION

PRIORITY CLAIM AND RELATED APPLICATIONS

This application is a continuation application of PCT Patent Application No. PCT/CN2014/079049, entitled "METHOD, DEVICE AND TERMINAL FOR ACTING ON GRAPHICAL OBJECTS DISPLAYED IN A MOBILE APPLICATION" filed on Jun. 3, 2014, which claims priority to Chinese Patent Application No. 201310438704.2, entitled "Method, Device and Terminal for Saving Images Based on A Social Networking Application," filed on Sep. 24, 2013, both of which are incorporated by reference in their entirety.

TECHNICAL FIELD

The current application relates generally to the field of Internet technology, and in particular to a method, device and terminal for acting on graphical objects (e.g., saving and/or editing images) displayed in a plug-in viewer (e.g., a Webview plug-in) of a mobile application (e.g., a social networking application).

BACKGROUND

Currently, more and more functions have been developed for social networking applications installed on user devices such as smart phones (e.g. Android mobile phone and an iOS mobile phone), tablet computers, personal digital assistants (PDA), mobile Internet devices (MID) and PAD, allowing user to browse the Internet (web surfing) in the social networking application. Usually, by tapping a hyperlink included in messages and postings (for example, information published by a public account platform) in the social networking application, the user may view and browse the webpage without exiting the social networking application. However, the user cannot efficiently save images in the webpage when browsing the webpage in the social networking application. Due to such deficiencies, users sometimes cannot save their favorite images, resulting in reduction of user attachment to browsing the Internet in the social networking application.

SUMMARY

The above deficiencies and other problems associated with the existing technology are addressed by the techniques disclosed herein. In some embodiments, the application is implemented in a computer system that has one or more processors, memory, and one or more modules, programs or sets of instructions stored in the memory for performing multiple functions. Instructions for performing these functions may be included in a computer program product configured for execution by one or more processors.

In one aspect, a computer-implemented method is performed by a computer system, such as a user device, e.g. smart phone. The user device may display a webpage in a user interface of a mobile application (e.g., a social networking application) in response to a first command gesture, wherein the webpage includes one or more graphical objects (e.g., images). After detecting a second command gesture directed to a blank portion of the displayed webpage, wherein the second command gesture is detected through the social networking application, the user device may generate respective thumbnail images for the one or more images of the webpage and display the thumbnail images in the user interface of the social networking application. In some embodiments, the mobile application uses a webview plug-in to display the webpage within the mobile application.

In another aspect, a computer system such as a user device, e.g. smart phone performing the method described herein is disclosed. The system or user device includes memory, one or more processors, and one or more program modules stored in the memory and configured for execution by the one or more processors. The one or more program modules include: a display module configured to display a webpage in a user interface of a social networking application in response to a first command gesture, wherein the webpage includes one or more images; a detection module configured to detect a second command gesture directed to a blank portion of the displayed webpage, wherein the second command gesture is detected through the social networking application; and an operation module having a generating unit configured to generate respective thumbnail images for the one or more images of the webpage in response to the second command gesture and cause the display module to display the thumbnail images in the user interface of the social networking application.

In another aspect, a non-transitory computer readable storage medium is disclosed. The non-transitory computer readable storage medium stores instructions, which when executed by a computer system, cause the computer system to: display a webpage in a user interface of a social networking application in response to a first command gesture, wherein the webpage includes one or more images; detect a second command gesture directed to a blank portion of the displayed webpage, wherein the second command gesture is detected through the social networking application; in response to the second command gesture: generate respective thumbnail images for the one or more images of the webpage; and display the thumbnail images in the user interface of the social networking application.

BRIEF DESCRIPTION OF DRAWINGS

Various embodiments will be more clearly understood as a result of the following detailed descriptions when taken in conjunction with the drawings. Like reference numerals refer to corresponding parts throughout the several views of the drawings.

It should be noted that the accompanying drawings in the following description are merely some embodiments, and persons of ordinary skills in the art may further obtain other drawings according to the descriptions of the present application without creative efforts.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The embodiments of the present application disclose a method, a device and a terminal for performing certain operations, such as saving, and editing, creating previews, etc., on graphical objects (e.g., images in a displayed webpage) in a mobile application (e.g., social networking application such as an instant messaging application or a chat program) executed on a mobile device. The mobile device has a relatively small screen as compared to a desktop computer, thus efficient use of the display and streamlining the user manipulation of the user interface is very important. Some embodiments disclosed herein allow a user to save the images when the user browses the webpage in the social networking application, resulting in significantly increased user attachment to browsing the webpage in the social networking application on the mobile device.

Figure 1:
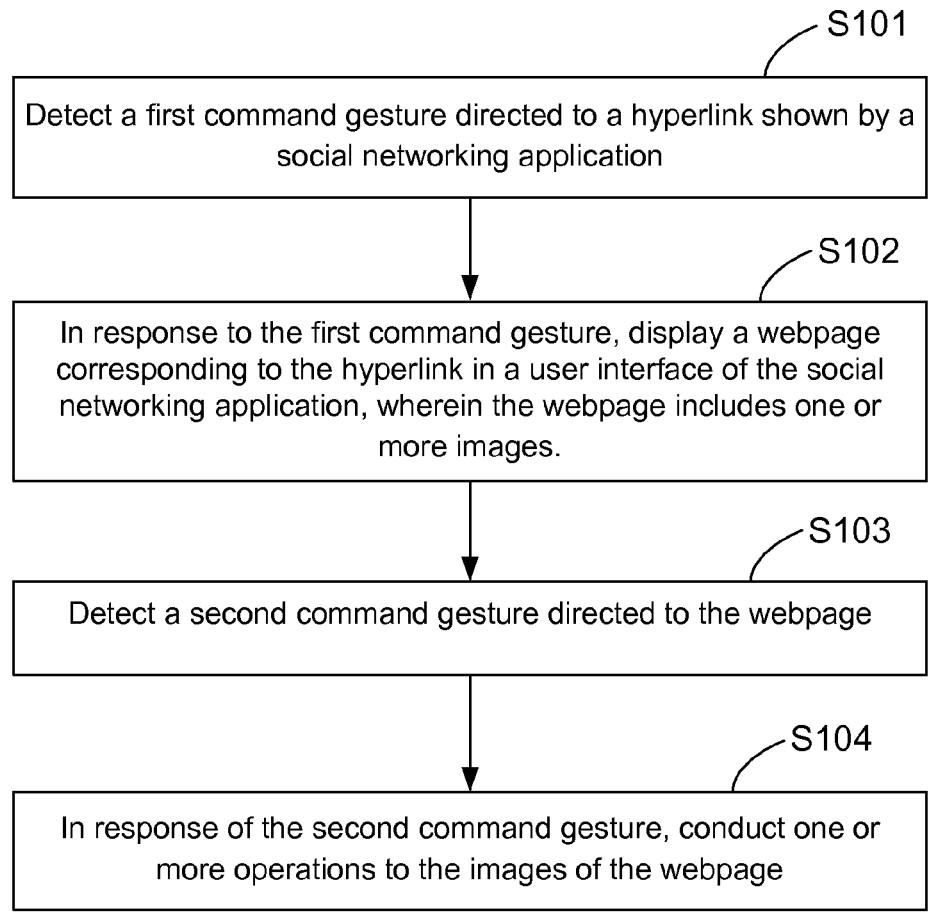
FIG. 1 is flowchart illustrative of a method for displaying a webpage and performing an operation on one or more images of the webpage in accordance with some embodiments.

FIG. 1 is a flowchart illustrative of a exemplary method for displaying a webpage and performing an operation on one or more images of the webpage in accordance with some embodiments.

As shown by step S101 of FIG. 1, a computer system, such as a user device, may detect a first command gesture directed to a hyperlink shown by a social networking application. In some embodiments, the hyperlink is shown by a plug-in viewer of the social networking application. In some embodiments, the hyperlink is shown by the social network application as being embedded in an instant message displayed in the social network application (e.g., as a clickable image or text segment in the instant message displayed in a conversation log of the social network application).

The computer system herein disclosed may be any kind of devices that have computational capabilities. In some embodiments, the computer system is a user device such as but not limited to mobile phones (such as Android mobile phones and iOS mobile phones), tablet computers, personal digital assistants (PDA), Mobile Internet Devices (MID), PAD, laptop computers, digital photo frames, and vehicle computers, etc. In some embodiments, the same method may be implemented on desktop computers as well.

In some embodiments, the first command gesture may be any command gesture that can be used to control, manage, initiate, terminate, or continue one or more operations (e.g., saving or displaying) on one or more objects or informational items (e.g., hyperlinks, webpages, icons, and images). A command gesture can be detected by the user device through, for example, a touch screen. In some embodiments, the first command gesture can be a command gesture such as but not limited to a tap gesture, a sustained contact gesture, a double tap gesture, or a swipe gesture. The first command gesture can be conducted by the user with one or more fingers (or other equivalents) or devices such as a stylus (or other equivalents).

In some embodiments, instead of a touch-based command gesture, the user device may detect a non-touch command. For example, the user device can detect a voice signal from a designated user, wherein the voice signal can be processed and the information extracted from the voice signal can be used to open a link to a webpage. Other types of commands that can be detected may be possible in various embodiments and are not enumerated one by one herein.

In some embodiments, the user device may detect the first command gesture directed to a hyperlink, which is included in an informational output by the social networking application. In some embodiments, the informational output by the social networking application, which is not specifically limited by the embodiments of the present application, may be information received from a friend or a related user in the social networking application. For example, the informational output can be an instant message and the hyperlink is embedded in the instant message. In some embodiments, the informational output may also be information published by public account platforms that are followed by the user. In some embodiments, the informational output may also be one or more webpages.

The social networking application can be any application or program that allows the user to communicate and stay in contact with fellow users. In some embodiments, the social networking application may display information including webpages by utilizing a plug-in viewer such as a plug-in internet browser (e.g. Webview). The plug-in viewer retrieves the webpage and renders the webpage in accordance with the display configuration of the user device. In some embodiments, the plug-in viewer has limited functionalities, for example, the plug-in viewer may only be able to display the content of the webpage, but does not provide functions to manipulate or save the objects or text in the webpage. In some embodiments, the activation of the plug-in viewer causes the operating environment (e.g., a javascript environment) for another program to be activated, such that the additional functions can be provided by the other program. In such cases, the program obtains some information from the plug-in viewer (such as location of the images and hyperlinks on the webpage, and URL corresponding to the images and hyperlinks, etc.), and some information from the I/O module of the social network application (such as the location and type of the user's command gestures provided on the touch screen, etc.) to implement the additional functions (e.g., saving and/or editing the images in the webpage, etc.).

In some embodiments, the first command gesture or any other command types (e.g. a voice command) detect by the user device may be directed not specifically to a hyperlink but to other displayed items or area. For example, the first command gesture may be a sustained-contact on a non-hyperlink portion of informational item, e.g. an instant message.

As shown by step S102 of FIG. 1, in response to the first command gesture, the user device may display a webpage corresponding to the hyperlink in a user interface of the social networking application. In some embodiments, the webpage includes one or more images. In some embodiments, the webpage may also include other types of graphical objects, such as icons, banners, pop-ups, etc. In some embodiments, the operations performed on different types of graphical objects are different and may be configurable by the user.

In some embodiments, a user device may, in response to the first command gesture, output the webpage corresponding to the hyperlink. For example, the user device may, in response to the first command gesture, e.g. a tap on the hyperlink included in the informational output by the social networking application, firstly load the webpage to a user interface, e.g. Webview, of the social networking application. Secondly, through the user interface, the user device may obtain the authority and the configuration of webpage for browsing from a server; and then load the content of the webpage corresponding to the hyperlink to the webpage according to the authority and the configuration of the webpage for browsing, to display the webpage corresponding to the hyperlink. In some embodiments, the authority is used for limiting the types of webpages which the user browses and the configuration is used for limiting the layout of the webpages.

As indicated, the first command gesture or other types of commands may be directed not to a hyperlink but to other displayed items or areas such as a blank portion of an instant message. For instance, when the user device detects that the first command gesture, e.g. a tap, is on a blank portion of an install message that includes multiple hyperlinks, the user device may display, e.g. sequentially, all webpages or a collection of the links to the webpages corresponding all the hyperlinks included in the message. With such an approach, if the user is not sure which hyperlink in the message leads to information the user wants, the user does not need to find all the hyperlinks and tap the hyperlinks in the message one by one, improving the efficiency of conducting operations on one or more hyperlinks in the message.

According to steps S101 and S102, the user may conveniently carry out an operation on a certain hyperlink or all the hyperlinks and the user device may display all or some of the webpages corresponding to the hyperlinks.

As indicated, the webpage may include one or more images, which refer to the images directly displayed in the webpage. The displayed images may have corresponding image files, which may include an original image that is the same as the displayed image or that has a higher resolution than the displayed image. In some embodiments, the displayed images also serve as hyperlinks that, when properly opened, lead to the display of original images included in the image file, which may also be referred to as the full-sized image. In some embodiments, the displayed images do not serve as hyperlinks and such images are the same as the original images.

Figure 2:
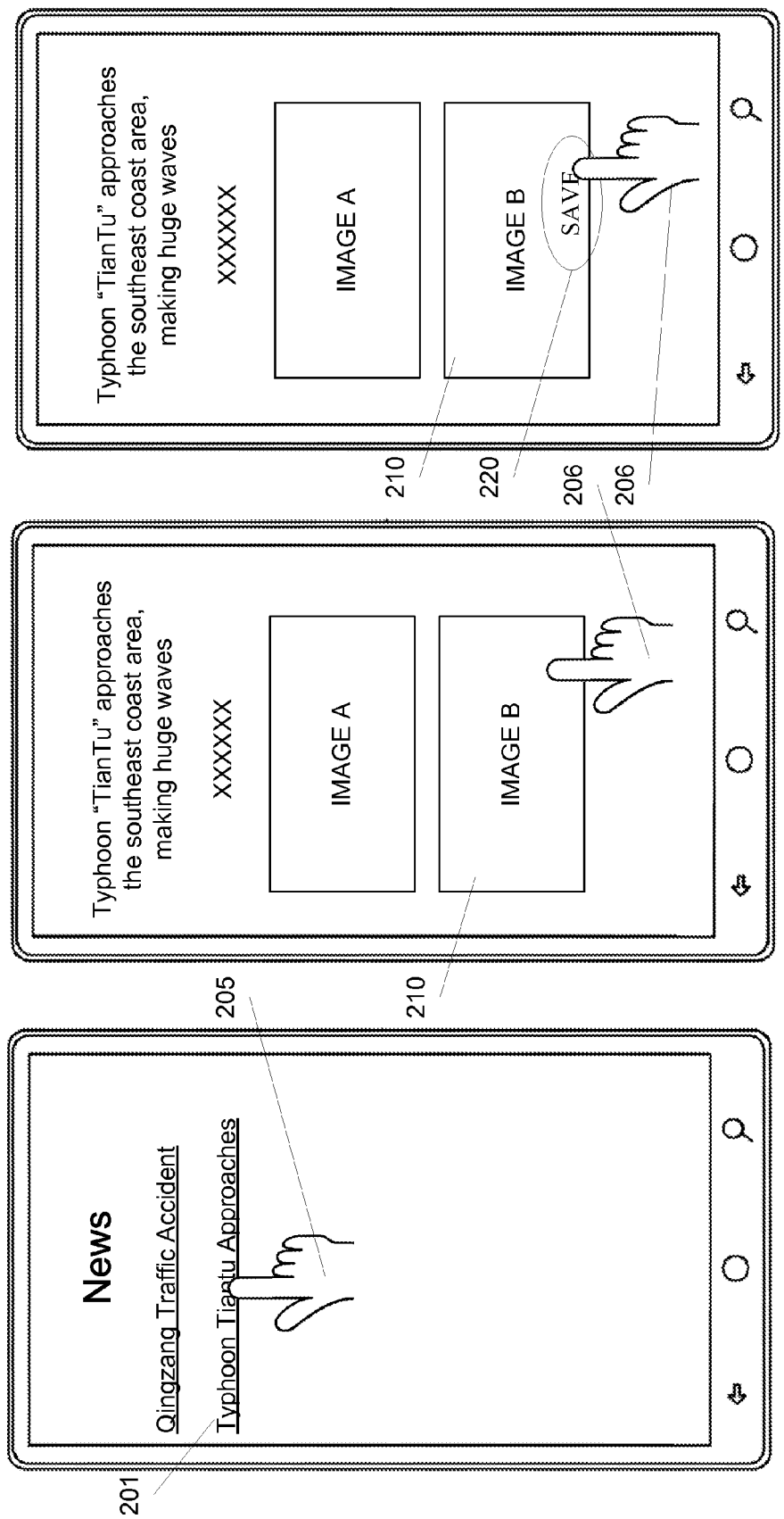
FIGS. 2A, 2B and 2C are sample screen shots illustrative of displaying a webpage and performing an operation on one or more images of the webpage in accordance with some embodiments.

FIG. 2A is a sample screen shot of a user device displaying an informational output through a user interface of a social networking application. The informational output includes sample hyperlinks such as hyperlink 201. A command gesture 205, as indicated by a finger touching the touch screen, may be detected by the user device. In FIG. 2A, the command gesture 205 is directed to the hyperlink 201. In some embodiments, the command gesture 205 is a tap and tapping the hyperlink 201 results in showing of a webpage as displayed in FIG. 2B. The webpage shown in FIG. 2B includes two images, image A and image B, wherein image B is referred to as image 210.

Referring back to FIG. 1, as shown by step S103 of FIG. 1, the user device may detect a second command gesture directed to the webpage (e.g., the webpage shown in FIG. 2B).

The second command gesture may be any command gesture that can be used to control, manage, initiate, terminate, or continue one or more operations (e.g., saving, editing, or displaying, etc.) on one or more objects or informational items (e.g., hyperlinks, webpages, and images, etc.). In some embodiments, the second command gesture can be a command gesture such as but not limited to a tap gesture, a sustained contact gesture, a double tap gesture, or a swipe gesture. The second command gesture can be conducted by the user with one or more fingers or devices such as a stylus. In some embodiments, instead of a touch-based command gesture, the user device may detect a non-touch command directed to the webpage. For example, the user device can detect a voice signal directed to the webpage.

In some embodiments, the second command gesture is directed to the webpage. In some embodiments, the second command gesture is directed to the images of the webpage. In some embodiments, the second command gesture is directed to non-image portions of the webpage.

In some embodiments, the user device may invoke ports and/or scripts, e.g. GetElementByPoint script, that can be used to detect command gesture on the touch screen, to detect the second command gesture directed to the webpage, e.g. images included in the webpage. For example, as shown in FIG. 2B, the user device may invoke ports and scripts, e.g. GetElementByPoint, to detect the second command gesture 206, which is represented by the hand in FIG. 2B. Command gesture 206 is directed to image 210 of the webpage shown by a user interface, e.g. the Webview interface, of the social networking application.

Referring back to FIG. 1, as shown by step S104 of FIG. 1, the user device may conduct one or more operations to the image or images of the webpage in response of the second command gesture.

In some embodiments, the second command gesture or other types of command is directed to an image of the displayed webpage. In some embodiments, the operation may be selected from: saving the displayed image in the user device or remotely, e.g. in the cloud, saving the original image if the original image has a higher resolution than the displayed image, generating a link to the image file, sending the displayed image to another user in an email or instant message, deleting the displayed image (if allowed), selecting the displayed image, hiding the displayed image, and any combination thereof. In some embodiments, the operation may also include actions to process or edit the image. For example, the operation may include one or more processing actions such as but not limited to: adjusting brightness, adjusting contrast, feathering, adjusting sharpness, selecting a part of the image, removing a part of the image, rotating, adjusting size, adding a layer, removing a layer, changing color mode, and adding text, etc.

In some embodiments, the operation can be any or a combination of actions affecting the displayed image and/or the image file. For example, the user device may, in response to the second command gesture, process the image and then save the image in a local file or in the cloud. For example, the user device may, in response to the second command gesture, perform a feathering processing to the image according to the preset feathering parameters and then save the edited image locally or remotely. The feathering processing of the image may make the edge of the image softer and makes the image more appealing.

To carry out the operations, the user device may optionally request additional approval from the user, or automatically proceed with the operation without requesting any additional approval from the user. Suppose the operation is to save the displayed image in the user device. FIG. 2B shows that the user conducts the second command gesture 206 on image 120 to save the image, wherein the command gesture 206 is a sustained contact—the user touches the touch screen where image 210 is displayed and the contact is longer than a threshold time period. When the sustained contact lasts longer than the threshold time period, the social networking application optionally displays an approval element 220 (e.g., a "save" button) overlaid on the image 210, continued contact of the command gesture 206 triggers the operation to save image 210. Alternatively, when the sustained contact lasts longer than the threshold time period, the social networking application automatically saves the image 210 without requesting further user approval for the save operation.

In some embodiments, with the command gesture 206, the user device can save the displayed image automatically in the user device without additional user approval. In some embodiments, the user device can provide an approval element in the user interface in response to the second command gesture or the commencement of the second command gesture, wherein the selection of the approval element approves saving of the images from the webpage, and wherein the approval element is selectable by a continuation of the second command gesture. For example, as shown by FIG. 2C, which is a sample screen shot following FIG. 2B, the user device displays the webpage including the images and the command gesture 206 is directed to image 210. As indicated, command gesture 206 can be a sustained contact and command gesture 206 has not been completed in FIG. 2C. In some embodiments, in response to the initiation of command gesture 206, the user device provides an approval element—the "Save" element 220—so the user can select the approval element and confirms that he/she wants the image 210 to be saved. The element 220 is presented as an oval button in FIG. 2C, but it should be noted that the specific design can vary. In some embodiments, the element 220 is presented at a position covering or being close the point of contact for the command gesture 206 so that the user does not need to change the command gesture 206 to finish the selection. In some embodiments, the element 220 is partially transparent so that the user may see the target image through the element 220. As shown in FIG. 2C, after seeing element 220, the user is fully informed as to what operation will be conducted if the element 220 is selected. The user may continue the command gesture 206 to select element 220 and the user device completes saving image 210 in response to the selection input. If the user decides that he/she does not want to save the image, he/she can slide the finger away so that the continuation of the command gesture 206 does not result in selection of element 220. In such a case, the image 210 is not saved. In some embodiments, the user device may also provide a menu in the user interface in response to the second command gesture, wherein each menu item in the menu is selectable by a continuation of the second command gesture. For example, in FIG. 2C, instead of the element 220, the user device displays a menu with one or more choices such as but not limited to: save to user device, save to cloud, hide, produce thumbnail image, enlarge, shrink, and cancel. The user can select a menu item by a continuation of the command gesture 206, e.g., by moving the contact to a desired menu choice without breaking contact with the touch screen.

In some embodiments, the user device may provide an approval element or a menu, but the user needs to generate an additional command gesture to complete the selection. For example, the second command gesture is used to identify the target image or images, and the approval element and the menu is provided after the second command gesture is completed. The user needs to conduct another command gesture to provide the approval or make the selection.

In some embodiments, when saving the images included in the webpage, the user device may prompt the user to save the images included in the webpage in a local folder or in the cloud. If the user selects to save the images included in the webpage in the local folder, the user device may save the images in a default local folder, or the user device may also prompt the user to select a local folder for saving the images and saves the images in the local folder selected by the user. If the user selects to save the images included in the webpage in the cloud, the user device may detect whether the user logs in a social networking application or not. If the user device detects that the user logs in the social networking application, the user device may save the images in the cloud associated with the account of the social networking application. If the user device detects that the user has not logged into an account on the social networking application, the user device may prompt the user to input the account information in the social networking application and save the images in the cloud associated with the account of the social networking application.

In some embodiments, the second command gesture may be directed not to the image but to other areas of the webpage. For example, the second command gesture or other types of commands may be directed to non-image areas such as a blank portion of a webpage. Here non-image areas are referring to areas that are not covered by an image and blank portion refers to areas that are not covered by image, text, or other types of characters or links. In some embodiments, approximation algorithms can be used to ascertain the target area of the command gesture. When the user device detects that the second command gesture, e.g. a sustained contact, is on a blank portion of a webpage that includes multiple images, the user device may conduct operations on all the images or a selected number of images based on preset rules. The selection of the images may be based on parameters such as the size of the image files or the date the image has been added. The operations can be any action that affects the image or image file. For example, the operations can be any or a combination of the operations or actions such as but not limited to: saving the displayed image in the user device or remotely, e.g. in the cloud, saving the original image if the original image has a higher resolution than the displayed image, generating a link to the image file, sending the displayed image to another user in an email or instant message, deleting the displayed image (if allowed), selecting the displayed image, hiding the displayed image, adjusting brightness, adjusting contrast, feathering, adjusting sharpness, selecting a part of the image, removing part of the image, rotating, adjusting size, adding a layer, removing a layer, changing color mode, adding text, and any combination or variation thereof. Similarly, the operation can be conducted automatically without additional user approval or with confirmation/approval from the user through selection of an approval element or menu item.

Therefore, the user may direct the second command gesture to a blank portion or a non-image area, e.g. area with text, to trigger operations on all or some of the images in the webpage. With such an approach, if the user is not sure which image in the webpage he/she wants to conduct the operation on (e.g. saving), the user does not need to view all the images one by one, improving the efficiency of conducting operations on one or more images in the webpage.

In accordance with some embodiments, after detecting a first command gesture directed to a hyperlink included in informational output by a social networking application, a user device may, in response to the first command gesture, output a webpage corresponding to the hyperlink. Furthermore, after detecting a second command gesture directed to images included in a webpage displayed by the social networking application, the user device may, in response to the second command gesture, save the images in a local folder or a cloud. Therefore, the method shown in FIG. 1 illustrates a mechanism for allowing the user to save the images when browsing the webpage in the social networking application, so that the attachment of the user to browsing the webpage in the social networking application may be significantly improved.

Figure 3:
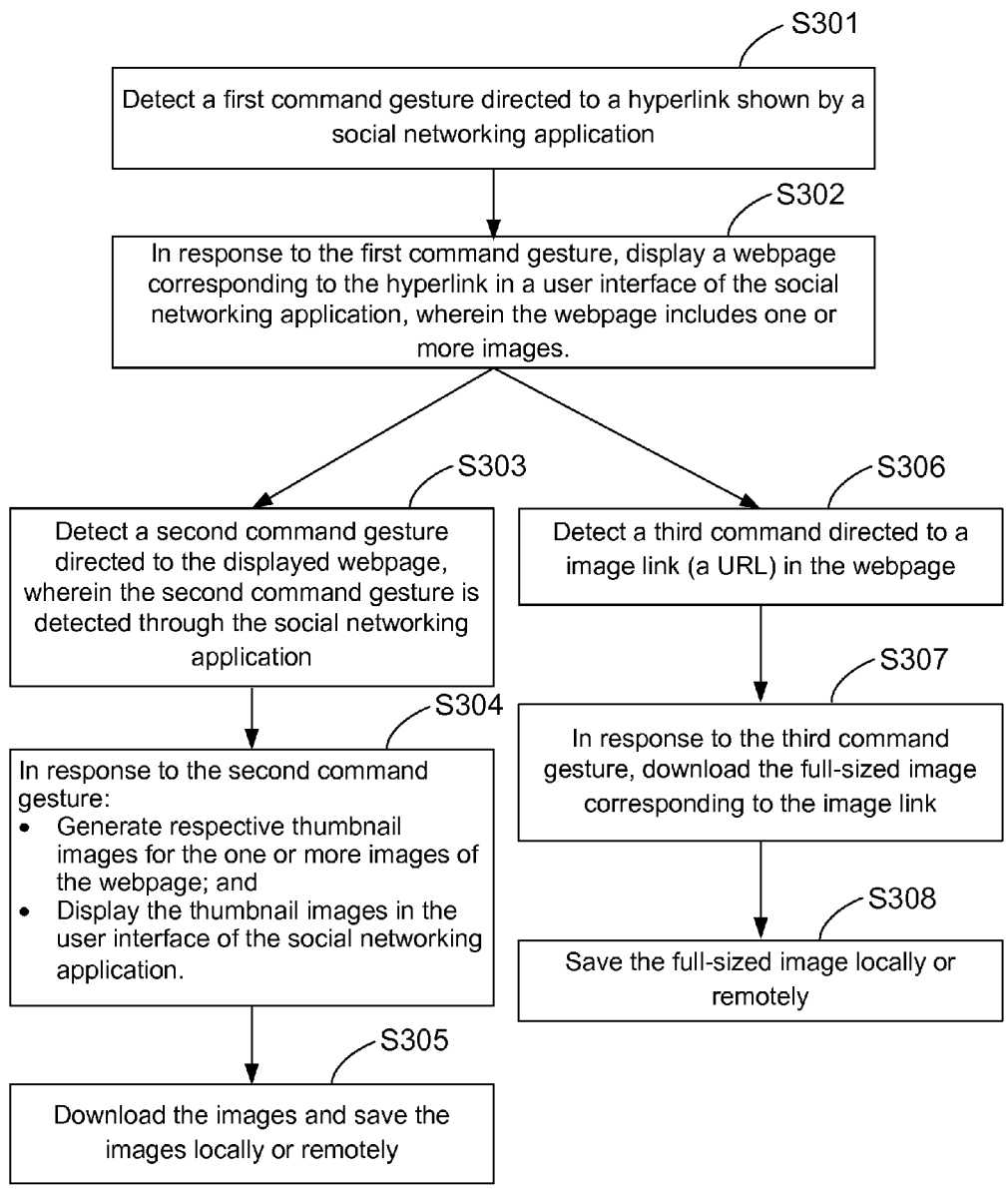
FIG. 3 is flowchart illustrative of a method for displaying a webpage and performing an operation on one or more images of the webpage in accordance with some embodiments.

FIG. 3 is flowchart illustrative of a method for displaying a webpage and performing an operation on one or more images of the webpage in accordance with some embodiments.

As shown by step S301 of FIG. 3, a user device can detect a first command gesture directed to a hyperlink shown by a social networking application. In some embodiments, the hyperlink is shown in a plug-in browser, e.g. Webview plug-in of the social networking application.

As shown by step S302 of FIG. 3, the user device, in response to the first operation, may display a webpage corresponding to the hyperlink in a user interface of the social networking application. In some embodiments, the webpage includes one or more images.

Steps S301 and S302 are in large part similar to steps S101 and S102 of FIG. 1. To avoid redundancy, not all the elements of steps S301 and S302 are described. Reference can also be made to FIGS. 2A and 2B.

Steps S303-S305 and steps S306-S308 provide two examples as to how the user device may conduct further operations on the image or images of the webpage. The general process covering these embodiments has been described for steps S103-S104 of FIG. 1. It should also be noted that certain variations may also be applied based on the default setup of the user device and the social networking application and the user's preferences.

As shown by step S303 of FIG. 3, the user device may detect a second command gesture directed to the displayed webpage. In some embodiments, the second command gesture is detected through the social networking application. The second command gesture may be directed to an image of the webpage or to non-image areas of the webpage.

For example, the second command gesture may be directed to a non-image area of the webpage. In some embodiments, further operations are triggered by a second command gesture directed to a blank portion of the webpage. In some embodiments, further operations are triggered by a second command gesture directed to the other areas, e.g. area with text or certain specific text (for example, text "save"), in the webpage.

Figure 4C:
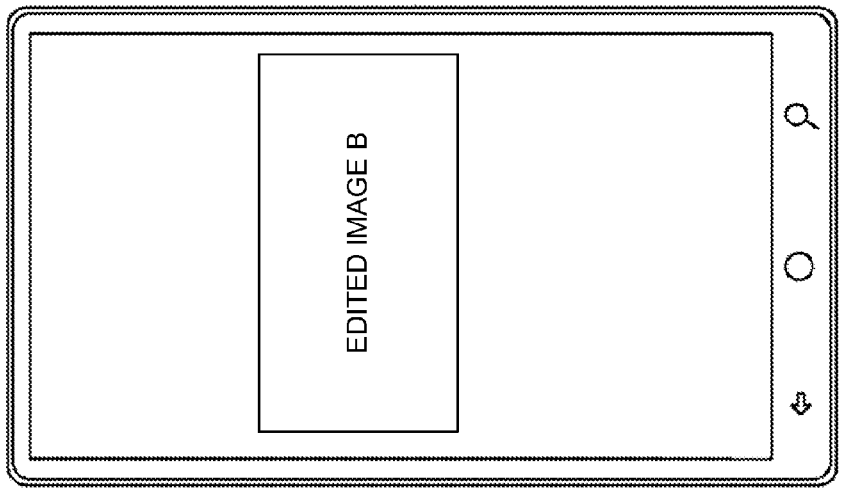
FIGS. 4A, 4B and 4C are sample screen shots illustrative of displaying a webpage and performing an operation on one or more images of the webpage in accordance with some embodiments.
Figure 4B:
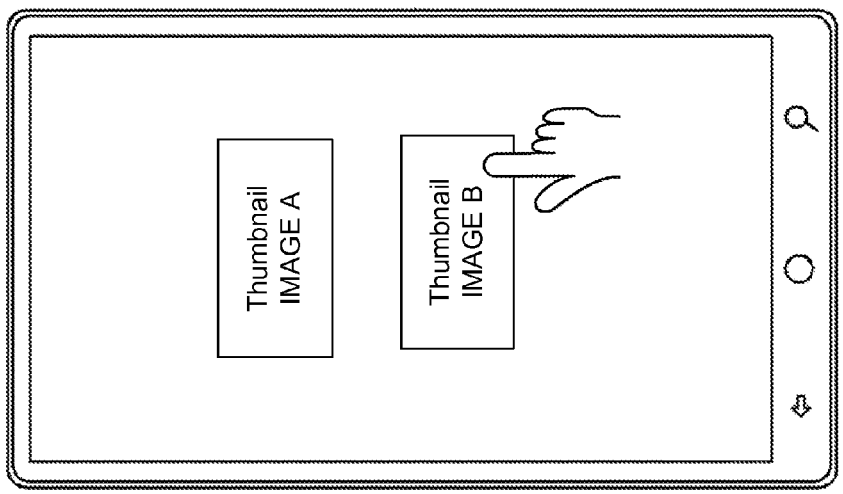
Figure 4A:
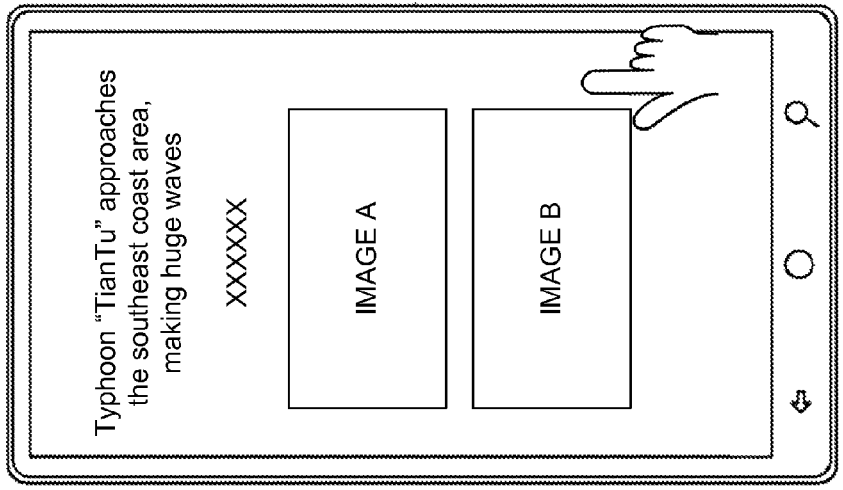

FIG. 4A shows a screen shot of the displayed webpage and the hand shown in FIG. 4A illustrates the location of a command gesture directed to a blank portion of the webpage. As in FIGS. 2A, 2B and 2C, the hand shown in FIGS. 4A, 4B and 4C is not actually shown by the user device. As shown in FIG. 4A, the displayed webpage includes at least two images: image A and image B. The command gesture is directed to a blank part of the webpage.

As shown by step S304 of FIG. 3, in response to the second command gesture, the user device may generate respective thumbnail images for the one or more images of the webpage. In some embodiments, the user device displays the thumbnail images in the user interface of the social networking application.

In some embodiments, the thumbnail images are simplified or summarizing versions of the displayed images. In some embodiments, the thumbnail images may optionally have a reduced size compared to the displayed images; the thumbnail images may optionally have a reduced resolution compared to the displayed images. In some embodiments, the thumbnail images are used to provide the user with an image collection that is easier to view and easier to operate on as a group.

The user device may display the thumbnail images after they have been generated so that the user can view the images more easily. For example, FIG. 4B shows that the user device is displaying thumbnail images for image A and image B. It should be noted that the user device may have different modes or formats to display the thumbnail images. In some embodiments, the thumbnail images are displayed without overlap. In some embodiments, the thumbnail images are display in a cascading manner. In some embodiments, the thumbnail images are displayed sequentially. For example, the thumbnail images can be displayed in a sequence of two or more subsets, each subset having a respective image count that is dynamically determined based on respective sizes of the thumbnail images. In this approach, the number of thumbnail images displayed in a subset may also be determined partly by the size of the user device's screen and the resolutions of the screen. Although FIGS. 4A-4B only shows two images in the webpage, when there are more images included in the webpage, the user interface in FIG. 4A may only be large enough to show two images, but more thumbnail images will be shown together on the user device in FIG. 4B, and the user can browse through the thumbnail images in FIG. 4B, e.g., by using a swipe gesture, or waiting for the user device to rotate through the different subsets of the thumbnail images on the display. In other words, the user can see the thumbnail images of all images on the webpage, even if the image has not yet been loaded and/or displayed on the webpage on the user device.

As shown by step S305 of FIG. 3, the user device may download the images and save the images locally or remotely. It should be noted that the operations described in S305 serve as an example of operations that can be conducted. In some embodiments, the downloading and saving operations can be conducted without additional command gestures. The second command gesture as detected in step S303 can trigger such operations and in some embodiments, a continuation of the second command gesture can lead to the operations in S305. As described for step S104 of FIG. 1, the downloading and saving operations may or may not require additional user approval. In some embodiments, the operations can be conducted automatically without additional user approval. In some embodiments, the operation can be conducted by providing an approval element or a menu and the approval can be provided by a continuation of the second command gesture. In some embodiments, the user needs to provide an additional command gesture, e.g. a tap, to provide the approval or make the selection.

In some embodiments, operations like the ones shown in step S305 may require additional command gesture(s) from the user to select the thumbnail image that is displayed. For example, the user may save or process the images by selecting the corresponding thumbnail image that is displayed. As shown in FIG. 4B, a command gesture is directed to the thumbnail image of image B, indicating that the user intends to conduct an operation on image B. As an example, the operation may be saving the image. The user device can identify the corresponding image file based on the thumbnail image and save the image locally or remotely. Alternatively, the operation may be processing the image. The user device can identify the corresponding image and process the image based on preset operations, e.g. feathering the image, and the edited image may be displayed by the user device. FIG. 4C shows that an edited image B is displayed. In addition, the operation may be a combination of processing and saving. The user device may identify the image, process the image, and save the edited image. Alternatively, the image can be saved before it is processed. The edited image can be displayed, as shown in FIG. 4C.

Similarly, the additional command gesture does not necessarily have to be directed to the thumbnail images. In some embodiments, the command gesture can be directed to areas (e.g. blank areas or text areas) that are not covered by the thumbnail images. For example, a command gesture directed to the blank area of the page displaying the thumbnail images can result in operations being conducted on all or selected images of the webpage.

Steps S306-S308 illustrate specific scenarios that the images displayed in the webpage are hyperlinks that lead to full-sized versions of the images. In such cases, the displayed images are image links—uniform resource locators (URL)—that can be used to identify the full-sized images. As shown by step S306 of FIG. 3, the user device may detect a third command gesture directed to an image link (a URL) included in a webpage output by a browser, e.g. Webview plug-in, of a social networking application.

As shown by step S307 of FIG. 3, in response to the third command gesture, the user device may download the full-sized image corresponding to the image link. In some embodiments, the full-sized image is downloaded from a server running the webpage. In some embodiments, the full-sized image is downloaded from a third party server.

As shown by step S308 of FIG. 3, the user device may save the full-sized image locally or remotely. Similarly, the operation in step S308—saving—serves as an example for various operations that can be conducted on the images of the webpage. The operations can be conducted with or without additional user approval. The user device may provide approval items or a menu to facilitate the operations.

Figure 5:
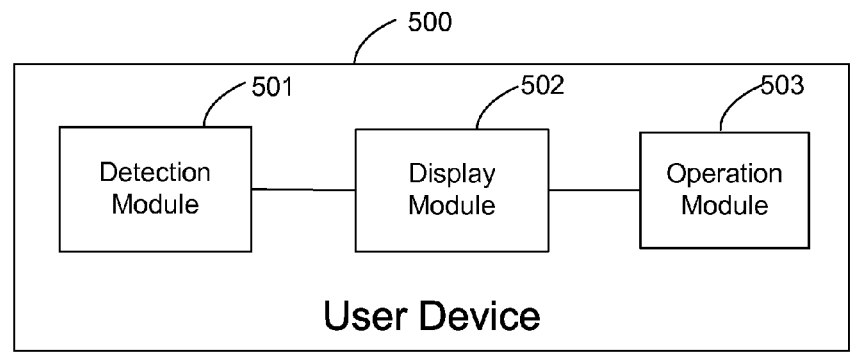
FIG. 5 is a block diagram of a user device for displaying a webpage and performing an operation on one or more images of the webpage according to some embodiments.
Figure 6:
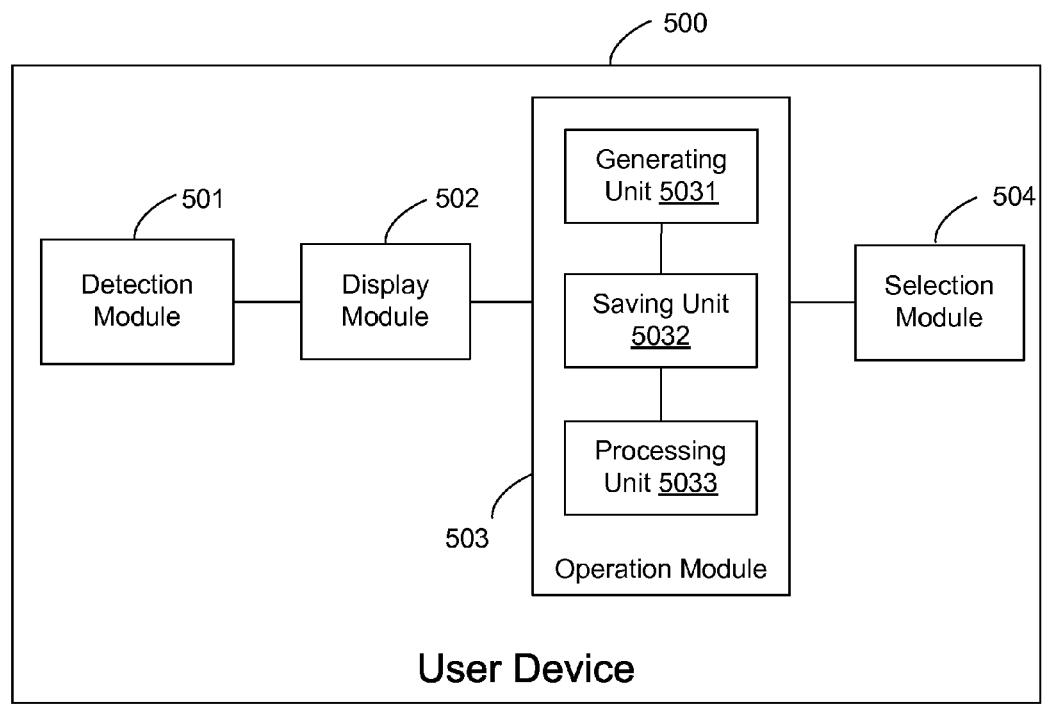
FIG. 6 is a block diagram of a user device for displaying a webpage and performing an operation on one or more images of the webpage according to some embodiments.
Figure 7:
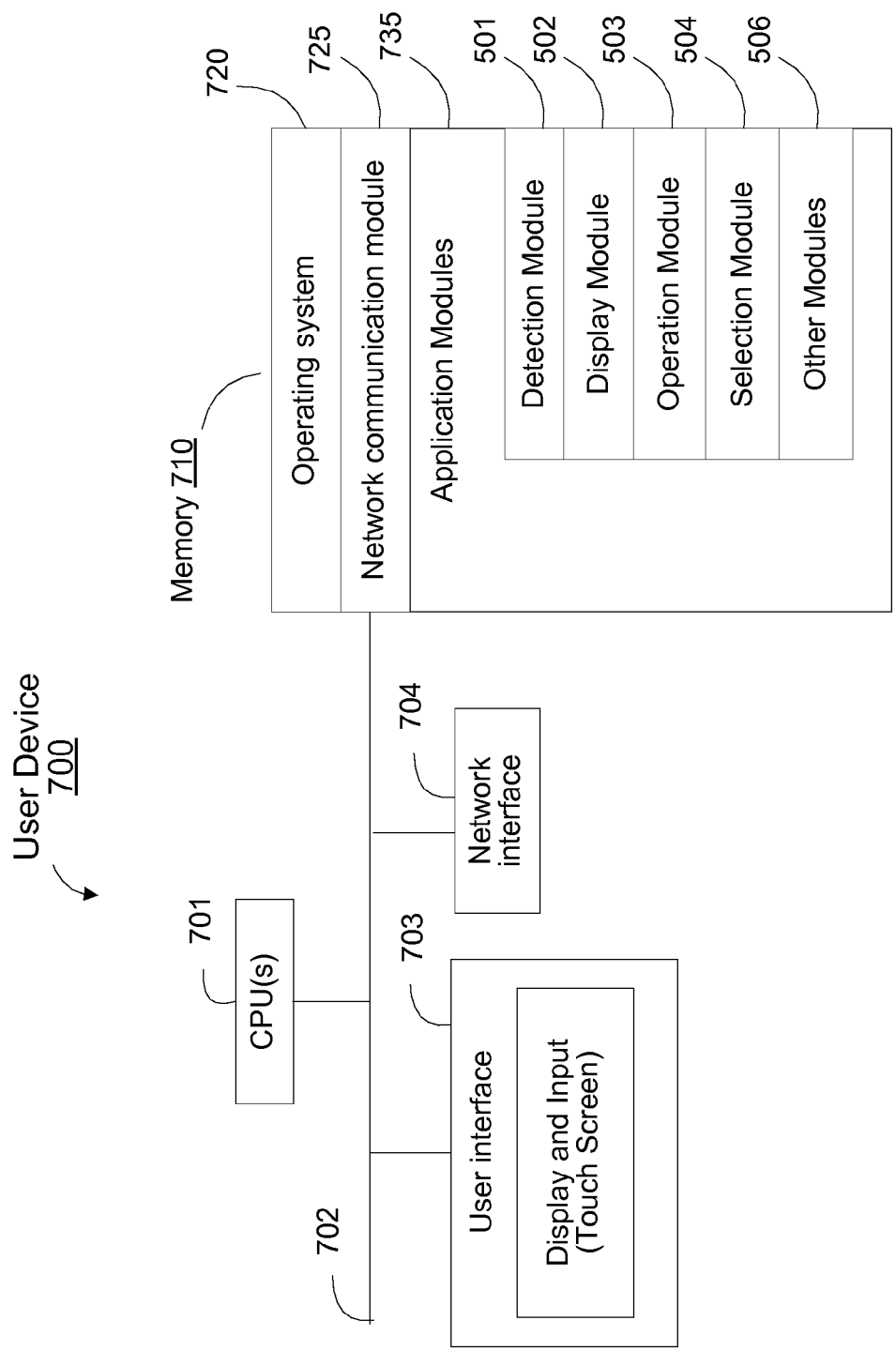
FIG. 7 is a schematic diagram of a device for displaying a webpage and performing an operation on one or more images of the webpage according to some embodiments.

FIG. 5, FIG. 6 and FIG. 7 illustrate the user device that may be used to perform the methods described above. To avoid redundancy, not all the details and variations described for the method are herein included for the devices. Such details and variations should be considered included for the description of the devices as long as they are not in direct contradiction to the specific description provided for the device.

FIG. 5 is a block diagram of a user device for displaying a webpage and performing an operation on one or more images of the webpage according to some embodiments of the present application. As indicated: the user device may be a device such as but not limited to mobile phones (e.g. Android mobile phones and iOS mobile phones), tablet computers, personal digital assistants (PDA), Mobile Internet Devices (MID), PAD, desktop and laptop computers, digital photo frame, and vehicle computers. As shown in FIG. 5, the user device 500 may comprise: a detection module 501, a display module 502, and an operation module 503.

The detection module 501 is configured to detect command gestures. For example, in some embodiments the detection module 501 is configured to detect a first command gesture directed to a hyperlink shown by a social networking application.

The display module 502 is configured to display contents such as a webpage in a social networking application. For example, in some embodiments the display module 502 is configured to display a webpage corresponding to the hyperlink in a user interface of the social networking application in response to the first command gesture. In some embodiments, the webpage includes one or more images.

In some embodiments, the detection module 501 is further configured to detect a second command gesture directed to the webpage. In some embodiments, the detection module 501 may be configured to invoke a port or scripts, e.g. GetElementByPoint, to detect the second command gesture directed to images included in the webpage.

The operation module 503 is configured to conduct one or more operations on one or more images of the webpage in response to command gesture, such as the second command gesture detected by the detection module 501. For example, the operation module 503 is configured to, in response to the second command gesture, save the images included in the webpage locally or remotely.

The operation can be any actions that affect the image or image file. For example, the operations can be any or a combination of the operations or actions such as but not limited to: saving the displayed image in the user device or remotely, e.g. in the cloud, saving the original image if the original image has a higher resolution than the displayed image, generating a link to the image file, sending the displayed image to another user in an email or instant message, deleting the displayed image (if allowed), selecting the displayed image, hiding the displayed image, adjusting brightness, adjusting contrast, feathering, adjusting sharpness, selecting a part of the image, removing part of the image, rotating, adjusting size, adding a layer, removing a layer, changing color mode, adding text, and any combination or variation thereof. Similarly, the operation can be conducted automatically without additional user approval or with confirmation/approval from the user through selection of an approval element or menu item.

In some embodiments, the operation module 503 may be configured to, in response to the second command gesture, save the images in the local folder or the cloud after the images are subjected to feathering processing. For example, the first storage module 504 specifically may be configured to, in response to the second command gesture, save an image in a local file or a cloud after the image is subjected to the feather processing according to the preset parameters. The feathering processing on the image according to the preset feather parameter may make the edge of the image softer and make the image more appealing.

FIG. 6 is a block diagram of a device for displaying a webpage and performing an operation on one or more images of the webpage according to some embodiments of the present application, showing more details. As shown in FIG. 6, the user device 500 comprises a detection module 501, a display module 502, an operation module 503, and a selection module 504. In addition, the operation module 503 may comprise a generating unit 5031, a saving unit 5032, and a processing unit 5033.

The detection module 501 is configured to detect command gestures. For example, in some embodiments the detection module 501 is configured to detect a first command gesture directed to a hyperlink shown by a social networking application.

The display module 502 is configured to display contents such as a webpage in a social networking application. For example, in some embodiments the display module 502 is configured to display a webpage corresponding to the hyperlink in a user interface of the social networking application in response to the first command gesture. In some embodiments, the webpage includes one or more images.

In some embodiments, as shown by the method illustrated by steps S301, S302, S303, S304, and S305 of FIG. 3, the display module 502 is configured to display a webpage in a user interface of a social networking application in response to a first command gesture, wherein the first command gesture is detected by the detection module 501 and the webpage includes one or more images. In addition, the detection module 501 is further configured to detect a second command gesture directed to a blank portion of the displayed webpage, wherein the second command gesture is detected through the social networking application. The operation module 503 has a generating unit 5031 configured to generate respective thumbnail images for the one or more images of the webpage in response to the second command gesture, wherein the display module 501 is further configured to display the thumbnail images in the user interface of the social networking application. In some embodiments, the detection module 501 is further configured to detect a selection input selecting a first thumbnail image among the displayed respective thumbnail images; the operation module 503 further comprises a processing unit 5032 configured to process the image corresponding to the first thumbnail image according to preset operations to generate a respective edited image in response to the selection input; wherein the display module 502 is further configured to display the edited image in the user interface. In some embodiments, the operation module 503 further comprises a saving unit 5033 configured to save the images from the webpage on the user device in response to the second command gesture. The images can be saved with or without additional user approval. For example, the saving unit 5033 can be further configured to automatically save the images without additional user approval.

The selection module 504 can be configured to provide approval elements or menus so that the user can provide approval or make selection regarding the operations that can be conducted. For example, for the method illustrated by steps S301, S302, S303, S304, and S305 of FIG. 3, the selection module 504 can be configured to provide an approval element in the user interface in response to the second command gesture, wherein the selection of the approval element approves saving of the images from the webpage, and wherein the approval element is selectable by a continuation of the second command gesture. Alternatively, the selection module 504 can be configured to provide a menu in the user interface in response to the second command gesture, wherein each menu item in the menu is selectable by a continuation of the second command gesture. In addition, the display module 502 can be further configured to display the thumbnail images in a sequence of two or more subsets, each subset having a respective image count that is dynamically determined based on respective sizes of the thumbnail images.

FIG. 7 is a schematic diagram of a user device 700 for displaying a webpage and performing an operation on one or more images of the webpage according to some embodiments of the present application. The user device 700 typically includes one or more processing units (CPU's) 701, one or more network interfaces 704, memory 710, and one or more communication buses 702 for interconnecting these components. The communication buses 702 may include circuitry (sometimes called a chipset) that interconnects and controls communications between system components. The user device 700 may include a user interface 703, for instance, a touch screen, which is both a display and an input device. Memory 710 may include high speed random access memory and may also include non-volatile memory, such as one or more magnetic disk storage devices. Memory 710 may include mass storage that is remotely located from the CPU's 701. In some embodiments, memory 710 stores the following programs, modules and data structures, or a subset or superset thereof:

an operating system 720 that includes procedures for handling various basic system services and for performing hardware dependent tasks;

a network module 725 that is used for connecting the user device 700 to other devices such as a server, via one or more communication networks (wired or wireless), such as the Internet, other wide area networks, local area networks, metropolitan area networks, and so on;

and a number of application modules 735 including the following:

a detection module 501 configured to detect command gestures; for example, in some embodiments the detection module 501 is configured to detect a first command gesture directed to a hyperlink shown by a social networking application;

a display module 502 configured to display contents such as a webpage in a social networking application; for example, in some embodiments the display module 502 is configured to display a webpage corresponding to the hyperlink in a user interface of the social networking application in response to the first command gesture;

an operation module 503 configured to conduct one or more operations on one or more images of the webpage in response to command gesture; and a selection module 504 configured to provide approval elements or menus so that the user can provide approval or make selection regarding the operations that can be conducted; and other modules 506 configured to provide other functions described herein.

In some embodiments, local files may be stored in the memory 710, and may also be stored in other storage mediums of the user device, which is not limited by the embodiments of the present disclosure.

In some embodiments, the user device shown in FIG. 7 discloses a mechanism for allowing the user to save the images when browsing the webpage in the social networking application, so that the attachment of the user to browse the webpage in the social networking application may be significantly improved.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present application to the precise forms disclosed. Many modifications and variations are possible in view of the above teachings. The implementations were chosen and described in order to best explain principles of the present application and its practical applications, to thereby enable others skilled in the art to best utilize the present application and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of acting on graphical objects, comprising:
at a user device having one or more processors and memory storing programs executed by the one or more processors:
displaying a webpage in a user interface of a social networking application in response to a first command gesture, wherein the webpage includes a plurality of images, and wherein the user interface is displayed in a plug-in viewer of the social networking application;
detecting a second command gesture directed to a blank portion of the displayed webpage that is not covered by any images of the webpage, wherein the second command gesture is detected through the social networking application; and
in response to the second command gesture:
determining that the second command is directed to the plurality of images on the webpage;
generating respective thumbnail images for the plurality of images of the webpage; and
displaying the plurality of thumbnail images in the user interface of the social networking application.

2. The method of claim 1, wherein:
the first command gesture is directed to a hyperlink embedded in an instant message.

3. The method of claim 1, further comprising:
detecting a selection input selecting a first thumbnail image among the displayed respective thumbnail images;
in response to the selection input, processing the image corresponding to the first thumbnail image according to preset operations to generate a respective edited image; and
displaying the edited image in the user interface.

4. The method of claim 1, further comprising:
in response to the second command gesture, saving the plurality of images from the webpage on the user device.

5. The method of claim 4, further comprising:
automatically saving the plurality of images without additional user approval.

6. The method of claim 1, further comprising:
providing an approval element in the user interface in response to the second command gesture, wherein the selection of the approval element approves saving of the plurality of images from the webpage, and wherein the approval element is selectable by a continuation of the second command gesture.

7. The method of claim 1, further comprising:
providing a menu in the user interface in response to the second command gesture, wherein each menu item in the menu is selectable by a continuation of the second command gesture.

8. The method of claim 1, wherein displaying the plurality of thumbnail images in the user interface of the social networking application further comprises:
displaying the plurality of thumbnail images in a sequence of two or more subsets, each subset having a respective image count that is dynamically determined based on respective sizes of the thumbnail images.

9. A user device, comprising:
one or more processors;
memory; and
one or more programs stored in the memory and configured for execution by the one or more processors, the one or more programs including instructions for:
displaying a webpage in a user interface of a social networking application in response to a first command gesture, wherein the webpage includes a plurality of images, and wherein the user interface is displayed in a plug-in viewer of the social networking application;
detecting a second command gesture directed to a blank portion of the displayed webpage that is not covered by any images of the webpage, wherein the second command gesture is detected through the social networking application; and
in response to the second command gesture:
determining that the second command is directed to the plurality of images on the webpage;
generating respective thumbnail images for the plurality of images of the webpage; and
displaying the thumbnail images in the user interface of the social networking application.

10. The user device of claim 9, wherein:
the first command gesture is directed to a hyperlink embedded in an instant message.

11. The user device of claim 9, wherein the one or more programs further include instructions for:
detecting a selection input selecting a first thumbnail image among the displayed respective thumbnail images; and
in response to the selection input, processing the image corresponding to the first thumbnail image according to preset operations to generate a respective edited image; and
displaying the edited image in the user interface.

12. The user device of claim 9, wherein the one or more programs further include instructions for:
saving the images from the webpage on the user device in response to the second command gesture.

13. The user device of claim 12, wherein the one or more programs further include instructions for:
    automatically saving the images without additional user approval.

14. The user device of claim 9, wherein the one or more programs further include instructions for:
    providing an approval element in the user interface in response to the second command gesture, wherein the selection of the approval element approves saving of the plurality of images from the webpage, and wherein the approval element is selectable by a continuation of the second command gesture.

15. The user device of claim 9, wherein the one or more programs further include instructions for:
    providing a menu in the user interface in response to the second command gesture, wherein each menu item in the menu is selectable by a continuation of the second command gesture.

16. The user device of claim 9, wherein displaying the plurality of thumbnail images in the user interface of the social networking application further comprises:
    displaying the plurality of thumbnail images in a sequence of two or more subsets, each subset having a respective image count that is dynamically determined based on respective sizes of the thumbnail images.

17. A non-transitory computer readable storage medium having stored therein one or more instructions, which, when executed by a user device, cause the user device to:
    display a webpage in a user interface of a social networking application in response to a first command gesture, wherein the webpage includes a plurality of images, and wherein the user interface is displayed in a plug-in viewer of the social networking application;
    detect a second command gesture directed to a blank portion of the displayed webpage that is not covered by any images of the webpage, wherein the second command gesture is detected through the social networking application; and
    in response to the second command gesture:
        determine that the second command is directed to the plurality of images on the webpage;
        generate respective thumbnail images for the a plurality of images of the webpage; and
        display the plurality of thumbnail images in the user interface of the social networking application.

18. The non-transitory computer readable storage medium of claim 17, wherein the instructions further cause the user device to:
    detect a selection input selecting a first thumbnail image among the displayed respective thumbnail images;
    in response to the selection input, process the image corresponding to the first thumbnail image according to preset operations to generate a respective edited image; and
    display the edited image in the user interface.

19. The non-transitory computer readable storage medium of claim 17, wherein the instructions further cause the user device to:
    in response to the second command gesture, saving the plurality of images from the webpage automatically without additional user approval.

20. The non-transitory computer readable storage medium of claim 17, wherein the instructions further cause the user device to:
    provide a menu in the user interface in response to the second command gesture, wherein each menu item in the menu is selectable by a continuation of the second command gesture.

* * * * *